United States Patent [19]

Komatsu et al.

[11] Patent Number: 4,657,610
[45] Date of Patent: Apr. 14, 1987

[54] METHOD FOR MANUFACTURING GAS PERMEABLE PACKAGING MATERIAL

[75] Inventors: Toshio Komatsu; Hideyuki Takahashi, both of Tokyo, Japan

[73] Assignee: Mitsubishi Gas Chemical Company, Inc., Tokyo, Japan

[21] Appl. No.: 836,501

[22] Filed: Mar. 5, 1986

[30] Foreign Application Priority Data

Mar. 6, 1985 [JP] Japan .................. 60-44440

[51] Int. Cl.$^4$ .............................. B32B 31/14
[52] U.S. Cl. .................. 156/87; 156/252; 156/253; 426/124; 428/137; 428/213; 428/219; 428/316.6
[58] Field of Search ............ 156/87, 252, 253; 426/106, 124; 428/131, 137, 138, 140, 213, 219, 316.6, 340

[56] References Cited

U.S. PATENT DOCUMENTS

| 3,674,109 | 7/1972 | Murase ............................ 156/87 |
| 4,262,050 | 4/1981 | Jenkins ........................... 428/137 |
| 4,332,845 | 6/1982 | Nawata et al. ................. 428/137 |
| 4,485,133 | 11/1984 | Ohtsuka et al. ............... 428/137 |
| 4,487,791 | 12/1984 | Kamatsu et al. .............. 428/137 |
| 4,567,080 | 1/1986 | Korsgaard ..................... 428/137 |
| 4,579,223 | 4/1986 | Otsuka et al. ................. 426/124 |

FOREIGN PATENT DOCUMENTS 0051096 5/1978 Japan ............................ 428/137

Primary Examiner—Caleb Weston
Attorney, Agent, or Firm—Leydig, Voit & Mayer

[57] ABSTRACT

A method of manufacturing a gas permeable packaging material, which comprises the steps of forming a laminate composed of an outer plastic film and a gas permeable inner sheet with a first heat-sealable layer interposed therebetween, perforating the laminate with a number of micro-pores, which extend from the outer film side to at least the inner sheet, heat-sealing a second heat-sealable film with or without a number of small-pores to the inner sheet, and, if the second heat-sealable film is of no porous, forming a number of small-pores in the second heat-sealable film, a pore ratio of the second heat-sealable film being greater than that of the outer film.

19 Claims, 2 Drawing Figures

F I G. 1
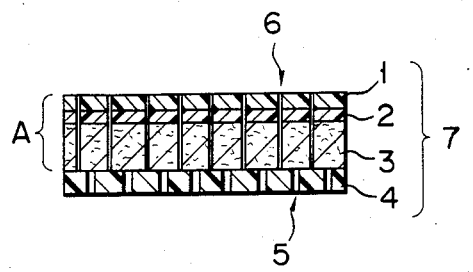
F I G. 2
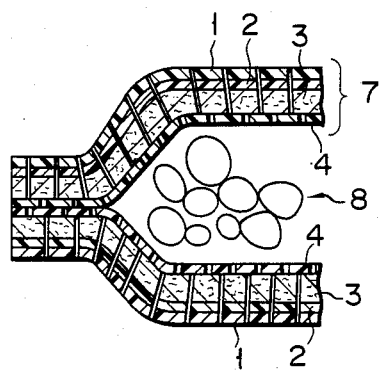
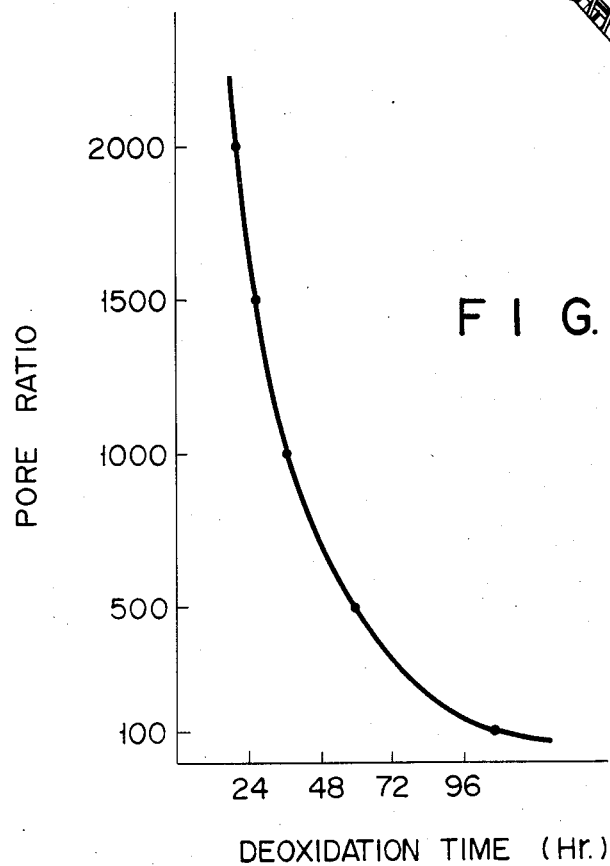
F I G. 3

METHOD FOR MANUFACTURING GAS PERMEABLE PACKAGING MATERIAL

BACKGROUND OF THE INVENTION (a) Field of the Invention

The present invention relates to a method of manufacturing gas-permeable material for packaging a deoxidization agent, a freshness-preserving agent, and other agents.

(b) Description of the Prior Art

Gas permeable materials have been used for packaging various agents, such as a drying agent, an insecticide, a deoxidization agent, a freshness-preserving agent, and the like. When these agents are used for preserving foods, the materials must be not only gas permeable, but also water-resistant, damage-resistant and hygienically safe.

The composite material consisting of a sheet of paper laminated with a perforated polyethylene film has been used for packaging a deoxidization agent. The gas permeability of the material is controlled by the ratio of the area occupied by the pores of the film to the entire surface area of the film (hereinafter called "pore ratio"). This material is, however, not resistant to water. Hence, when the bags made of the composite material and containing a deoxidization agent are used to preserve food of a high moisture content, they are damped, whereby the agent oozes out through the pores. In the worst case, the bags may be broken, and the agent may come into contact with the food. The composite material is not preferred from a hygienical point of view.

The gas permeability of the polyethylene-paper material cannot always be well controlled. During the thermal bonding of the polyethylene film and the sheet of paper, the pores are deformed, whereby the material fails to have the desired gas permeability. If the bags made of such material and containing a deoxidization agent, it is difficult to control the oxygen absorption rate.

Japanese Patent Disclosures No. Sho 53-51096 and No. Sho 53-50065 disclose a packaging material consisting of two perforated plastic films laminated together and a packaging material consisting of two perforated plastic films and a sheet of paper interposed between these films. These materials are more water-resistant than a sheet of paper. Their gas permeability is, however, impaired since an adhesive such as polyethylene is used to adhere the plastic films together, or to adhere the paper sheet to the plastic films. Hence, with these materials it is practically impossible to control the gas permeability by changing the pore ratio.

Another similar composite material for packaging a deoxidization agent is known. This is a laminate made by adhering a plastic film to a layer of adhesive such as polyethylene, perforating the resultant laminate and heat-sealing laminate to a perforated heat-sealable film with a sheet of paper interposed between the laminate and heat-sealable film. This composite material has a drawback. It cannot have a desired gas permeability since the pores of the laminate and heat-sealable film are deformed during the heat sealing, inevitably changing the gas permeability, or the chips made in perforating the laminate stick in the pores, adversely reducing the gas permeability.

Japanese Patent Disclosure No. Sho 56-124440 discloses a packaging material made by preparing two perforated laminates each consisting of a plastic film and a sheet of paper, and by adhering the paper sheets of the laminates are bonded with an adhesive. It is also extremely difficult with this packaging material to control the gas permeability, since a layer of the adhesive such as ethylene-vinyl acetate copolymer is interposed between the paper sheets.

Japanese Patent Disclosure No. Sho 56-124441 also discloses a packaging material comprised of two laminates. One of the laminates consists of a plastic sheet and a sheet of paper, and is perforated. The other laminate consists of a plastic film having a gas permeability of 3000 ml/m² 24 Hr. atm. or more, and a sheet of paper. The paper sides of these two laminates are faced and sealed each other with an adhesive layer interposed therebetween to integrally form a packaging material. With this packaging material it is also hard to control the gas permeability since a layer of the adhesive such as ethylene-vinyl acetate copolymer.

In summary, with the conventional packaging materials it is extremely difficult to control the gas permeability accurately.

SUMMARY OF THE INVENTION

It is an object of the present invention is to provide a method of manufacturing a packaging material which is greatly water-resistant and whose gas permeability can easily be controlled.

According to the invention, there is provided a method of manufacturing a gas permeable packaging material, said method comprising the steps of:

forming a laminate by heating an outer plastic film and a gas permeable inner sheet, with a first heat-sealable layer interposed between the film and sheet;

forming a large number of small-pores in the laminate, extending from the outer film to at least the inner sheet; and placing, on the inner sheet of the laminate, a second heat-sealable film having a number of small-pores and a pore ratio greater than that of the outer plastic film, and heating the second heat-sealable film, thereby adhering the second heat-sealable film to the inner sheet of the laminate.

According to the invention, there is provided another method of manufacturing a gas permeable packaging material, said method comprising the steps of:

forming a laminate by heating an outer plastic film and a gas permeable inner sheet, with a first heat-sealable layer interposed between the film and sheet;

forming a large number of small-pores in the laminate, extending from the outer film to at least the inner sheet;

placing, on the inner sheet of the laminate, a second heat-sealable film and heating the same, thereby adhering the second heat-sealable film to the inner sheet of the laminate; and forming a number of small-pores in the laminate from the second heat-sealable film, extending through at least the second heat-sealable film but not through the outer film, a pore ratio of the second heat-sealable film being greater than that of the outer film.

BRIEF DESCRIPTION OF THE DRAWINGS

FIG. 1 is a cross-sectional view of the gas permeable packaging material manufactured by a method according to the present invention;

FIG. 2 is a cross-sectional view of part of a bag made of the packaging material shown in FIG. 1.

DESCRIPTION OF THE PREFERRED EMBODIMENT

A strong plastic film is preferable for the outer film of the packaging material according to this invention, since it is not broken during the manufacture of bags and during the use of the bags. The film is made of polyethylene terephthalate, polyamide, polypropylen, polycarbonate or cellophane. Of these materials, polyethylene terephthalate or polyamide are preferable since they are strong and easy to handle in manufacturing the packaging material. It is desired that the outer film have a thickness of 50 microns or less, more preferably 10 to 20 microns. When the thickness is greater than 50 microns, the outer film will become difficult to handle.

There are no limitations to the gas permeability of the outer film, but it is generally desired that the oxygen permeability of the film be not more than 1000 ml/m² 24 Hr. atm., preferably not more than 500 ml/m² 24 Hr. atm.

When it is necessary to perform a printing on the outer film, it should be printed on the side away from the side which will contact food. This measure taken, the food will not be contaminated with the printing ink. This side of the outer film can be solid-pained after characters have been printed. In this case, the contents of the bag made of the packaging material, if oozing out of the inner film, cannot be seen from outside, whereby the outer appearance of the bag is not impaired.

The first heat-sealable film of the packaging material of the invention is used to adhere the outer film to the gas permeable inner sheet. It is a plastic film of polyethylene, ethylene-vinyl acetate copolymer, ionomer resin, polybutadiene or vinyl chloride. Alternatively, it can be made of heat sealable coating agent such as ordinary hot-melt agent, hot-melt emulsion, ionomer latex, ionomer emulsion, polyethylene emulsion or ethlene-vinyl acetate copolymer emulsion. When the first heat-sealable film is a plastic one, its thickness is preferably 10 to 70 microns, more preferably 15 to 40 microns. When the first heat-sealable film is a heat sealable coating agent, it is desired that the heat sealable coating agent is coated in an amount of 0.5 to 30 g/m², more preferably 5 to 20 g/m².

The first heat-sealable film is adhered to or coated on the outer film which is not gas permeable. When a strong adhesion between the outer film and the gas permeable inner sheet is required, two heat-sealable films can be used.

Paper or nonwoven fabric is used for the gas permeable inner sheet of the packaging. The paper may be Japanese paper, rayon-mixed Japanese paper or ordinary paper. The basis weight of the paper used ranges from 5 g/m² to 100 g/m². The nonwoven fabric can be a wet-processed one, a dry-processed one or a spun-bonded one. It can be made of polyamide, polyethylene terephthalate, rayon, or the like. The paper or nonwoven fabric can be coated with a water-repellant or an oil-repellant.

The second heat-sealable film, which is gas permeable, of the packaging material of the invention is made of polyethylene, polyethylene-vinyl acetate copolymer, ionomer, polybutadiene or vinyl chloride.

The method according to the invention will now be described with reference to the drawings attached hereto. First, as shown in FIG. 1, outer film 1, first heat-sealable film 2, and gas permeable inner sheet 3 are laid one upon another, and are then heated, thereby adhering film 1 to inner sheet 3 and providing laminate A. Laminate A can be prepared in other ways. For example, film 2 is formed by applying molten material into the gap between film 1 and sheet 3, in which case the resultant laminate is passed through cold rollers after the material has solidified. Alternatively, film 2 is adhered to outer film 1, then inner sheet 3 is laid on film 2, and finally the three members are heated and boded together, thus forming laminate A.

Three-layer laminate A is perforated with a needle, either hot or cold, thus forming a number of small-pores 6 opening in outer film 1. The diameter of pores 6 and the number of pores 6 per a unit area are selected in accordance with the desired gas permeability of the packaging material, which generally ranges at most 30% in pore ratio. To be more specific, the major axis of pores 6 may range from 0.02 to about 3 mm, in order to prevent the enclosed material from oozing out or being wetted and in view of manufacturing efficiency. These pores must be deep enough to extend from the outer side of film 1 into the surface region of inner sheet 3. The pores can be through holes, in which case it is easy to perforate laminate A.

Second heat-sealable film 4 is laid on gas permeable, inner sheet 3. The unfinished product consisting of laminate A and film 4 is heated, whereby film 4 is adhered to sheet 3. Small-pores 5 are formed in second heat-sealable film 4 and partially in inner sheet 3, either before or after the thermal adhesion. When film 4 is perforated after the thermal adhesion, pores 5 must not be so deep that they extend through inner sheet 3. It is preferred that pores 5 are made in such positions that they do not communicate with pores 6 of laminate A. If pores 5 are elliptical, their major axis may range from 0.02 mm to about 5 mm in order to prevent the enclosed material from oozing out or being wetted and in view of manufacturing efficiency. However, the size of pore 5 is not critical. They are formed in general in such numbers that film 4 have a pore ratio of 0.2 to 30%. The pore ratio of film 4 should be set such that even if the pores in film 4 are deformed by the thermal adhesion to laminate A, the pore ratio remaining in the film 4 should be larger than that of the outer film 1. For example, it is desirable that its pore ratio must be 50% or more greater than that of laminate A. Hence, the gas permeability of the packaging material according to the invention is determined by the pore ratio of film 1.

Second heat-sealable film 4 without pores is adhered to inner sheet 3, thus forming a gas permeable, packaging material 7. Film 4 can be laminated with laminate A in various methods such as thermal lamination, extrusion lamination, dry lamination and wet lamination.

Packaging material 7, thus manufactured, is folded, as shown in FIG. 2, with second heat-sealable film 4 positioned inside. The three edges of the folded are heat-sealed after deoxidization agent 8 has been placed between the halves of packaging material, whereby a bag containing deoxidization agent 8 is provided.

The bag shown in FIG. 2 can be used to contain not only a deoxidization agent, but also drying agents, insecticides, alcohol-based freshness-preserving agents, or the like. The control of the gas permeability of such a packaging material is important particularly when the material is used to manufacture bags containing deoxidization agents including sulfite, hydrogen sulfite, 2-thionite, hydroquinone, catecol, resorcinol, pyrogallol, gallic acid, ronalite, ascorbic acid, iso-ascorbic acid, and its salt, sorbose, glucose, lignin, dibytyl-hydroxytoluene, butyl-hydroxyanisole, ferrous salt, metal powder such as iron powder, a deoxidization agent producing carbon dioxide gas, and a deoxidization agent absorbing carbon dioxide gas. Among them, iron powder, ascorbic acid, iso-ascorbic acid, and its salt are most preferable. Packaging material 7 of this invention, whose gas permeability can easily be controlled, is suitable as the material for such bags.

In the method of the present invention, pores 6 formed in outer film 1, which controls the gas permeability of the packaging material, are neither deformed nor closed. Hence, the material can therefore have the desired pore ratio. Since the heat-sealable films used in this invention have pores, they do not impair the gas permeability of the packaging material. The gas permeability is determined by only the pore ratio of laminate A. It is, therefore, easy to control the gas permeability of the material. Furthermore, the material is very resistant to water.

[EXAMPLES]

The present invention will be described in more detail with reference to examples.

EXAMPLE 1

Characters were printed on one side of polyethylene terephthalate film (i.e., outer film 1) having a thickness of 12 microns. Then, this side of film 12 was then coated with white ink. Film 12 and polyethylene film (i.e., first heat-sealable film 2) were subjected extrusion lamination, thereby forming a composite sheet. The composite sheet was laminated with a sheet of Japanese paper having a basis weight of 50 g/m² (i.e., inner sheet 3), thus providing laminate A. Pores having a diameter of 0.2 mm were formed in laminate A, at intervals of 5 mm in both the vertical direction and the horizontal direction. Sheet A thus perforated had a pore ratio of 0.12%. The perforated laminate A was adhered to a polyethylene film having a thickness of 30 microns (i.e., second heat-sealable film 4). Pores having a diameter of 0.2 mm were formed in film 4, at intervals of 2.5 mm in the vertical direction and at intervals of 1.5 mm in the horizontal direction. These pores did not penetrate inner sheet 3. Perforated film 4 had a pore ratio of 0.83%. As a result, a packaging material was obtained. The material was cut into rectangular pieces having a width of 50 mm and a length of 100 mm. These pieces were placed on a table, with second heat-sealable film 4 turned upward. An iron-based deoxidization agent is put on each piece, in an amount of 1.5 g. The piece was folded double, and the three sides of the folded piece were sealed by a three-direction bar heater, thereby providing a bag containing the iron-based deoxidization agent.

CONTROLLER 1

A controller (hereinafter called "Controller 1") was prepared. A sheet of white paper having a basic weight of 50 g/m² was laminated with a polyethylene film, thereby providing a packaging material. The polyethylene film had pores having a diameter of 0.2 mm and formed at intervals of 2.5 mm in the vertical direction and at intervals of 1.5 mm in the horizontal direction. This packaging material was cut into rectangular pieces having a width of 50 mm and a length of 100 mm. These pieces were placed on a table, with the polyethylene film turned upward. The same iron-based deoxidization agent is put on each piece, in an amount of 1.5 g. The piece was folded double, and the three sides of the folded piece were sealed by a three-direction bar heater, thereby providing a bag containing the deoxidization agent.

The bag of Example 1 and that of Controller 1 were each put on a wet layer of cotton, the water content of which was 5 cc/g. Each bag and the wet cotton layer were put into a KOP/PE bag and sealed therein along with 500 cc of air. The KOP/PE bags were stored at 35° C. Two days later, the oxygen concentrations in the KOP/PE bags were analyzed, and the bags were taken out of the KOP/PE bags and were examined to see the condition of the deoxidization agent. The results were as shown in the following table.

TABLE 1

| | Oxygen concentration after 2 days | Condition after 14 days | |
| --- | --- | --- | --- |
| | | Exudation | Wetting |
| Example 1 | Not more than 0.1% | None | None |
| Controller 1 | 2.1% | Rust transferred to cotton | All surface wet |

EXAMPLE 2

Characters were printed on one side of a polyamide film (i.e., outer film 1) having a thickness of 15 microns. Then, this side of the polyamide film was coated with white ink. The polyamide film and a polyethylene film (i.e., first heat-sealable film 2) were laminated, thereby forming a composite sheet. The composite sheet was laminated with a sheet of white, oil-resistant paper having a basis weight of 40 g/m² (i.e., inner sheet 3), thus laminate A. Laminate A was cut into smaller sheets. Pores having a diameter of 0.1 mm were formed in five of these smaller sheets, so that the five sheets had different pore ratios, i.e., 0.008%, 0.039%, 0.079%, 0.118% and 0.157%, respectively. A polyethylene film having a thickness of 30 microns (i.e., second heat-sealable film 4) was laid on the paper sheet of each perforated smaller sheet. Pores having a diameter of 0.2 mm were formed in film 4, at intervals of 2.5 mm in the vertical direction and at intervals of 1.5 mm in the horizontal direction. These pores did not penetrate inner sheet 3. Perforated film 4 had a pore ratio of 0.83%. As a result, five kinds of packaging materials were obtained. These materials were cut into rectangular pieces having a width of 50 mm and a length of 100 mm. These pieces were placed on a table, with second heat-sealable film 4 turned upward. An iron-based deoxidization agent is put on each piece, in an amount of 2.0 g. The piece was folded double, and the three sides of the folded piece were sealed by a three-direction bar heater, thereby providing a bag containing the iron-based deoxidization agent.

The bags of Example 2 were each put into a KOP/PE bag and sealed therein along with 500 cc of air. The KOP/PE bags were stored at 25° C. The oxygen concentration of each KOP/PE bag was measured at 24th hour, 36th hour, 48th hour, 60th hour and 72nd hour. The relation between the pore ratios of the packaging materials, on the one hand, and the oxygen concentrations measured at different times, on the other hand, was as shown in the following table:

TABLE 2

| Number of micro-pores of outer material side (Number/100 cm) | Pore ratio (%) | Concentration of oxygen | | | | |
|---|---|---|---|---|---|---|
| | | 24th hr. | 36th hr. | 48th hr. | 60th hr. | 72ond hr. |
| 100 | 0.008 | 12.4% | 9.4% | 7.1% | 4.9% | 3.2% |
| 500 | 0.039 | 9.7 | 5.9 | 2.6 | 0.1 | 0.0 |
| 1,000 | 0.079 | 5.5 | 0.6 | 0.0 | — | — |
| 1,500 | 0.118 | 2.0 | 0.0 | — | — | — |
| 2,000 | 0.159 | 0.0 | — | — | — | — |

As Table 2 shows, it was confirmed that the speed of oxygen absorption of the bags was controlled by the pore ratio of the outer laminate.

EXAMPLE 3

Characters were printed on one side of a polyethylene terephthalate film (i.e., outer film 1) having a thickness of 12 microns. Then, this side of film 12 was coated with white ink. The polyethylene terephthalate film, a polyethylehe film having a thickness of 20 microns (i.e., first heat-sealable film 2), and a nonwoven fabric sheet of polyethylene terephthalate having a basis weight of 35 g/m² (i.e., inner sheet 3) were subjected to thermal lamination, thus providing a laminate A. Pores having a diameter of 0.2 mm were formed in laminate A, at intervals of 5 mm in both the vertical direction and the horizontal direction. Laminate A thus perforated had a pore ratio of 0.12%. The perforated sheet A was laminated with a polyethylene vinyl acetate film having a thickness of 40 microns (i.e., second heat-sealable film 4). Pores having a diameter of 0.2 mm were formed in film 4, at intervals of 2.0 mm in the vertical direction and the horizontal direction, thus imparting to film 4 a pore ratio of 0.78% (These pores did not penetrate inner sheet 3.) As a result, a packaging material was obtained. The material was cut into rectangular pieces having a width of 50 mm and a length of 100 mm. These pieces were placed on a table, with second heat-sealable film 4 turned upward. An iron-based deoxidization agent is put on each piece, in an amount of 1.5 g. The piece was folded double, and the three sides of the folded piece were sealed by a three-direction bar heater, thereby providing a bag containing the iron-based deoxidization agent. Each bag was put into a KOP/PE bag and sealed therein along with 500 g sponge cake. The KOP/PE bags were left to stand at 25° C. Two days later, the oxygen concentrations in the KOP/PE bags were found to be 0%. One month later, the sponge cake in all bags of Example 2 was well preserved, no mildewed at all. Nor did the deoxidization agent ooze out, and the outer appearance of the bags was good.

As a controller, 500 g of sponge cake was put into a KOP/PE bag, which was left to stand and 25° C. One week later, the bag was opened. The sponge cake was found to have been mildewed.

EXAMPLE 4

The same experiments as in Example 1 were repeated except that the diameter of the pores 6 were varied to 0.1 mm (pore ratio, 0.21%), 0.3 mm (pore ratio, 1.88%) and 0.4 mm (pore ratio, 3.34%). As a result, oxygen concentration after two days in each cases was less than 0.1% and no exudation nor wetting was seen after 14 days of storing at 35° C.

What is claimed is:

1. A method of manufacturing a gas permeable packaging material, comprising the steps of:

forming a laminate by heating an outer plastic film and a gas permeable inner sheet, with a first heat-sealable layer interposed between the film and sheet;

forming a large number of small-pores in the laminate, extending from the outer film to at least the inner sheet; and placing, on the inner sheet of the laminate, a second heat-sealable film having a number of small-pores and a pore ratio greater than that of the outer plastic film, and heating the second heat-sealable film, thereby adhering the second heat-sealable film to the inner sheet of the laminate.

2. A method of manufacturing a gas permeable packaging material, comprising the steps of:

forming a laminate by heating an outer plastic film and a gas permeable inner sheet, with a first heat-sealable layer interposed between the film and sheet;

forming a large number of small-pores in the laminate, extending from the outer film to at least the inner sheet;

placing, on the inner sheet of the laminate, a second heat-sealable film and heating the same, thereby adhering the second heat-sealable film to the inner sheet of the laminate; and forming a number of small-pores in the laminate from the second heat-sealable film, extending through at least the second heat-sealable film but not through the outer film, a pore ratio of the second heat-sealable film being greater than that of the outer film.

3. The method according to claim 1, wherein the thickness of the outer film is not more than 50 microns.

4. The method according to claim 1, wherein said heat-sealable films are made of a thermoplastic material.

5. The method according to claim 1, wherein said heat-sealable films are formed by coating a heat sealable coating agent on the gas permeable inner sheet in an amount of 0.5 to 30 g/m².

6. The method according to claim 1, wherein said gas permeable inner sheet is made of paper or nonwoven fabric.

7. The method according to claim 6, wherein said paper or nonwoven fabric has a basis weight of 15 to 100 g/m².

8. The method according to claim 1, wherein said laminate is formed by adhering three layers by heat-pressing.

9. The method according to claim 1, wherein said laminate is formed by pouring a molten heat sealable coating agent into the gap between said outer film and said gas permeable inner sheet and then cooling the heat sealable coating agent.

10. The method according to claim 2, wherein said second heat-sealable film is laminated with said laminate by heat-pressing.

11. The method according to claim 1, wherein said second heat-sealable film has a pore ratio of 0.2 to 30%, the pore ratio of said second heat-sealable film being greater than that of said outer film.

12. The method according to claim 2, wherein the thickness of the center film is not more than 50 microns.

13. The method according to claim 2, wherein said heat-sealable films are made of a thermoplastic material.

14. The method according to claim 2, wherein said heat-sealable films are formed by coating a heat sealable coating agent on the gas permeable inner sheet in an amount of 0.5 to 30 g/m².

15. The method according to claim 2, wherein said gas permeable inner sheet is made of paper or nonwoven fabric.

16. The method according to claim 15, wherein said paper or nonwoven fabric has a basis weight of 15 to 100 g/m².

17. The method according to claim 2, wherein said laminate is formed by adhering three layers by heat-pressing.

18. The method according to claim 2, wherein said laminate is formed by pouring a molten heat sealable coating agent into the gap between said outer film and said gas permeable inner sheet and then cooling the heat sealable coating agent.

19. The method according to claim 2, wherein said second heat-sealable film has a pore ratio of 0.2 to 30%, the pore ratio of said second heat-sealable film being greater than that of said outer film.

* * * * *

UNITED STATES PATENT AND TRADEMARK OFFICE
CERTIFICATE OF CORRECTION

PATENT NO. : 4,657,610

DATED : April 14, 1987

INVENTOR(S) : KOMATSU ET AL.

It is certified that error appears in the above-identified patent and that said Letters Patent is hereby corrected as shown below:

In the Drawings, Figure 3 should be deleted.

Signed and Sealed this

Fifteenth Day of December, 1987

Attest:

DONALD J. QUIGG

*Attesting Officer*   *Commissioner of Patents and Trademarks*